United States Patent [19]

Cameron

[11] Patent Number: 4,632,259

[45] Date of Patent: Dec. 30, 1986

[54] STORAGE DEVICE

[76] Inventor: Douglas A. Cameron, 1714 Bedford Sq., Rochester, Mich. 48064

[21] Appl. No.: 586,779

[22] Filed: Feb. 11, 1985

[51] Int. Cl.$^4$ ............................................. A47F 5/01
[52] U.S. Cl. ................................. 211/119; D6/463; D6/465; 211/41; 211/181
[58] Field of Search ................ 211/41, 181, 119, 106, 211/118; D6/463, 465, 462, 459; 248/175

[56] References Cited

U.S. PATENT DOCUMENTS

| | | | |
|---|---|---|---|
| D. 180,883 | 8/1957 | Perry | D6/463 |
| 680,450 | 8/1901 | Aiken | 211/181 X |
| 1,079,241 | 11/1913 | Hertsgaard | 211/119 |
| 1,104,970 | 7/1914 | Dean | 211/181 X |
| 1,986,486 | 1/1935 | Swanson. | |
| 2,600,755 | 4/1948 | Greensfelder. | |
| 2,746,882 | 5/1956 | Hamal | 211/41 X |
| 2,972,414 | 1/1960 | Sipe. | |
| 3,094,215 | 6/1963 | Sipe | 211/41 X |
| 3,926,314 | 12/1975 | Dogliotti | 211/71 |
| 4,037,737 | 7/1977 | Stevens et al.. | |

Primary Examiner—Robert W. Gibson, Jr.
Attorney, Agent, or Firm—Harness, Dickey & Pierce

[57] ABSTRACT

A storage device for storing plastic container covers and lids as disclosed as comprising a frame having a plurality of alternating directional bends, a plurality of shelf elements mounted on the frame at approximately each alternating directional bend portion, and a plurality of support elements secured to the shelf elements for providing rigidity of the storage device.

19 Claims, 6 Drawing Figures

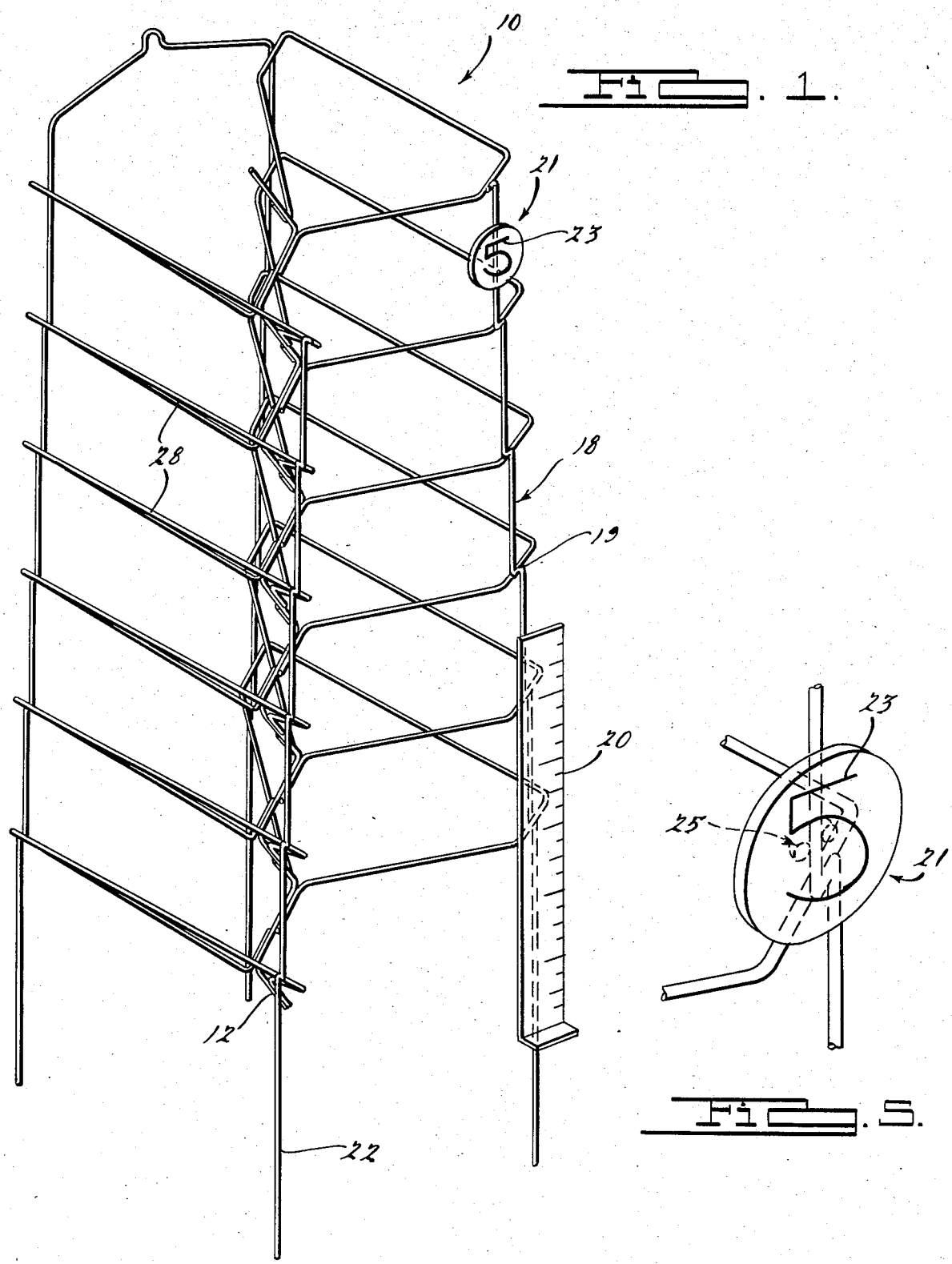

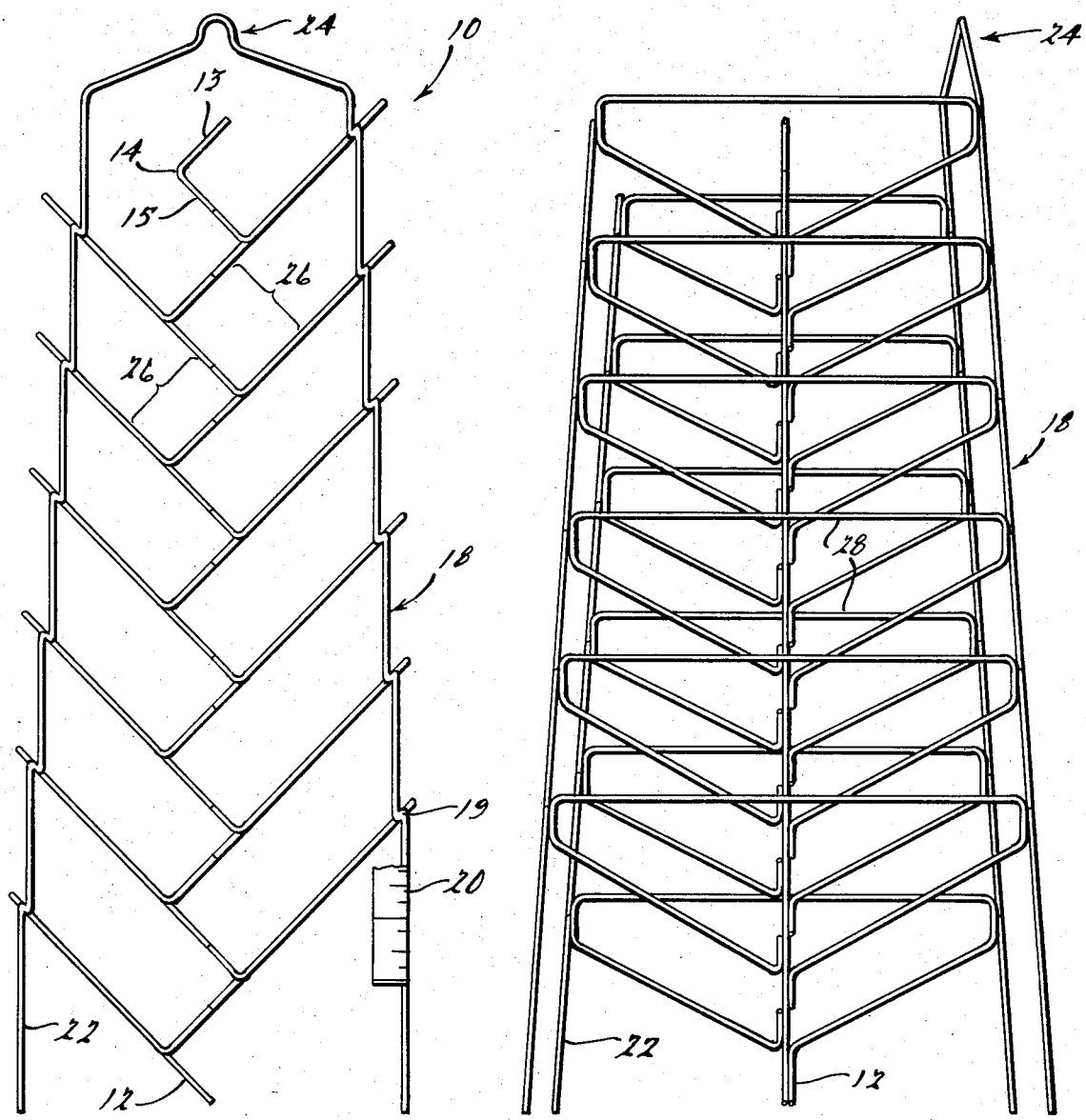
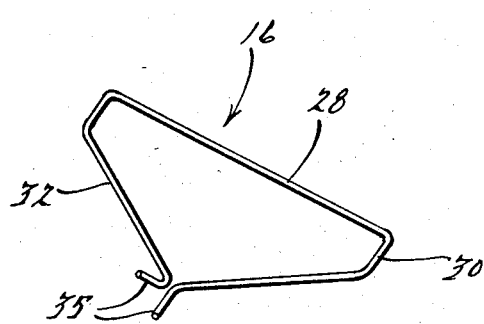
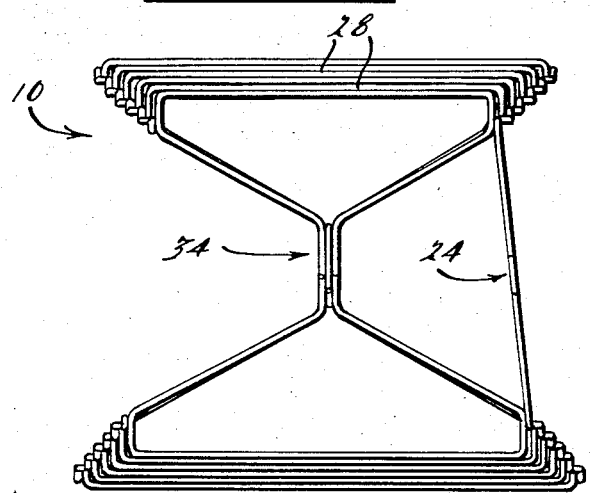

STORAGE DEVICE

BACKGROUND AND SUMMARY OF THE INVENTION

The present invention relates to the field of storage devices. In particular, the present invention relates to the storage of plastic container covers or lids. In the past, these covers or lids have been kept in cupboards and drawers in random order making it difficult for the user to select the correct cover without trying several different ones until finally finding the one that fits. There has been a need in the field for a device which allows for selective organization of lids of different sizes. The present invention provides a device which fulfills the present needs.

Accordingly, it is the primary object of the present invention to provide a storage device for storing lids, covers and the like, in a neat and orderly fashion to enable the user to quickly find a lid or cover for a particular container. The present invention also provides an identification system for identifying the different sizes of covers or lids. The present invention provides a measurement device to determine the size of the container so that the correct sized cover or lid is matched with the proper container.

To achieve the foregoing objects, the present invention provides a storage device which generally comprises a frame having a plurality of alternating directional portions, a plurality of shelf means secured to approximately (almost) all of the alternating directional portions, and a plurality of support members secured to the shelf means to rigidly solidify the frame and shelf means. The frame generally is a zigzag frame having alternating zig portions and zag portions at approximately 90° to one another.

Other objects and advantages of the present invention will become apparent upon the reading of the detailed description of the preferred embodiments taken in conjunction with the accompanying drawings and appended claims.

BRIEF DESCRIPTION OF THE DRAWINGS

FIG. 1 is a perspective view of the storage device.

FIG. 2 is a side elevational view of the storage device.

FIG. 3 is a front elevational view of the storage device.

FIG. 4 is a plan view of the storage device.

FIG. 5 is a perspective view of an identification element.

FIG. 6 is a perspective view of a shelf member.

DETAILED DESCRIPTION OF THE PREFERRED EMBODIMENT

Referring to FIG. 1, a perspective view of the storage device 10 according to the present invention is shown. The storage device 10 is generally comprised of a frame generally comprised of a single elongated frame member, preferably a rod, 12 having alternating directional portions 14, a plurality of shelf members 16 and a plurality of support members 18. A measuring device 20 may be secured to the storage device 10 along with an identification element 21. The plurality of support members 18 generally extend past the plurality of shelf members 16 providing the storage device 10 with a plurality of legs 22 thus providing for the storage device 10 to be free standing. Also, the storage device 10 may have a hook portion 24 provided by the junction of a pair of support members 18 so that the storage device 10 may be secured to a cupboard, wall, or the like by conventional hanging means.

The alternating directional portion frame can best be seen in FIG. 2. The frame 12 is generally a zigzag frame having alternating zig portions 13 and zag portions 15 at approximately 90° angles with respect to one another. The storage device 10, is manufactured from any suitable material, metallic or plastic, preferably metallic wire coated with an elastomeric substance. A shelf space 26 is formed between alternating zigzag portions and is approximately the same spacing throughout the frame 12. However, if desired, due to an exceptional amount of one cover size over the other sizes, the shelf spaces 26 could be varied and adapted to suit the specific needs of the user by enlarging the shelf spaces 26 to a suitable size.

Each shelf member 16 is comprised of a crossbar portion 28, a pair of securing portions 30, a pair of leg portions 32, and a mounting portion 34. The shelf members 16 will be discussed singularly, however, the discussion will pertain to the plurality of shelf members 16. The shelf member 16 has an overall planar triangular shape. The crossbar portion 28 acts as the base of the triangle, adjacent to the crossbar portion 28, on each side, is the securing portion 30, which is approximately transverse or perpendicular to the crossbar portion 28. The pair of leg portions 32 angularly depart from the securing portions 30 at approximately an angle of 45° toward one another. The mounting portion 34 is a pair of arms 35, one arm 35 extending from each leg 32, one arm 35 which is approximately parallel to the securing portions 30, and the other arm which is approximately perpendicular to the securing portion 30.

The shelf member 16 is secured on the frame 12 at mounting portion 34 by conventional means, such as welding. The arms 35 of the mounting portion 34 are positioned on adjacent alternating directional portions 14 of the frame 12 and are secured to the frame 12, thus forming approximately a 90° angle between the two arms 35. The shelf members 16 are secured on approximately all of the frames alternating directional portions. The zigzag frame 12 provides for the shelf member 16 to project from the frame 12 at approximately 45° with respect to the frame's horizontal axis. The alternating directional portions 14 form two columns of shelf members 16 one on each side of the frame 12 as can best be seen in FIG. 4. The shelf members 16 in their respective column are substantially parallel to one another and are substantially transverse to the other column of shelf members 16.

The plurality of support members 18 are elongated rod members being securely fastened at the securing portion 30 of the shelf member 16 for providing rigidity to the storage device 10. The support members 18 are vertically extending from one shelf member to the next successive adjacent shelf element 16, on the same column side. The support members 18 have a plurality of angular portions 19 at each shelf member 16 for mounting the shelf members 16 to the support members 18. The angular portions 19 have an angle approximately equal to the angular slope of the shelf members 16. The support members 18 narrow at each angular portion 19 providing the support member 18 to be approximately perpendicular in the shelf space 26 with respect to the storage device 10. Therefore, when illustrated in plan view, FIG. 4, the storage device 10, has a butterfly configuration and the support members 18 are positioned on the tips of the wings of the butterfly, thus necessitating four support members 18 to rigidly secure the two columns of shelf members 16 to the frame 12. The support members 18 also provide a retainer means for the storage device 10. The support members 18 provide no lateral movement in the shelf space 26 of the covers or lids. Thus, the covers or lids can be removed from the storage device 10 by withdrawing the cover or lid in a direction parallel with the shelf members 16. Also, the covers or lids are maintained in the shelf members 16 by gravitational forces abutting the covers or lids against the alternating directional portions 14 of the frame 12 on one side and by the support members 18 on two other sides.

The shelf members 16 vary in size so that different sized covers or lids can be maintained in a separate shelf space 26. Generally the shelf members 16 increase in size from top to bottom of the device 10. The larger shelf members 16 generally being adjacent to the support member legs 22 and the smaller shelf member 16 adjacent to the hook portion 24. Generally the two columns of shelf members are designed so that one column's smallest shelf member is larger than that of the other columns' largest shelf member. Thus, the larger and intermediate covers or lids are in one column and the intermediate to smaller covers or lids are in the other column. The varying of size of the shelf members 16 provides that the support members 18 narrow from the support member legs 22 to hook portion 24 of the storage device 10.

FIG. 5 is an illustration of a marking device 21 used to indicate a particular size of a cover or lid that is being held in the particular shelf space 26. The marker is preferably circular, however, it could be any geometric configuration. The marker has a clip 25 on its back surface to securely hold the marker onto the device 10, preferably on a support member 18. The markers 21 normally possess indicia 23 indicating the size of the lids which are in a particular shelf space 26. The markers 21 may be color coded to provide a different color of marker 21 for each size of a cover or lid that is contained in the shelf spaces 26 of the storage device 10.

The measuring means 20, perferably a conventional ruler, is supplied and mounted to a support member 18 so that a container may be measured on the measuring device 20 to determine the size of the cover or lid which is needed to fit the container. The measuring means 20 can be color coordinated with the markers 21 enabling proper election of the cover or lid with a corresponding container. Therefore, by matching the color on the measuring device 20, with the color of the marker 21, designating a particular shelf space 26, the user will automatically be able to obtain the correct size of cover or lid which is needed to fit the container.

While it will be apparent that the preferred embodiments as illustrated herein are well calculated to fill the objects of the above stated, it will also be appreciated that the present invention is susceptible to modification and variation without changing from the scope and spirit of the present invention.

What is claimed is:

1. A storage device comprising:
   a frame having a plurality of alternating directional portions, said frame comprised of a single elongated frame member having said alternating directional portions,
   a plurality of shelf means on said elongated frame member at said alternating directional portions for providing for a plurality of support surfaces; and
   a plurality of support members secured to said plurality of shelf means for providing rigidity of said shelf means on said frame.

2. The device according to claim 1 wherein said alternating directional portions depart at an angle of about 90° to one another.

3. The device according to claim 2 wherein said elongated frame member is a zigzag rod having a 90° angle between each zig portion and each zag portion of said elongated frame member.

4. A device as in claim 2 wherein said shelf means comprises:
   a crossbar;
   a pair of securing portions adjacent to each end of said crossbar for securing said shelf means to said support members;
   a pair of legs having free extending ends and adjacent to said pair of securing means for providing a support surface; and
   a means for mounting said shelf means to said frame positioned on said free extending ends of said pair of legs.

5. A device as in claim 4 wherein each said shelf means has an overall planar triangular configuration.

6. A device as in claim 5 wherein said means for mounting said shelf means to said frame is a pair of adjacent approximately perpendicular arms for securing said shelf means onto said frame at said alternating directional portions forming two columns of shelf means one on each side of said frame.

7. A device according to claim 6 wherein said plurality of support members are positioned at said securing portion of said shelf means.

8. A device according to claim 7 wherein said plurality of support members are vertical and secure said shelf members to the next adjacent successive shelf member on the same column side.

9. A device according to claim 8 wherein said plurality of said support members are four elongated rods, said rods having a plurality of angular portions secured to said plurality of shelf means at said securing portions and extending beyond said shelf means for providing support legs for a free standing storage device.

10. A device according to claim 9 wherein said shelf means are of different sizes increasing in size from one end of said frame to the other.

11. A storage device comprising:
    a frame having a plurality of alternating directional portions, said frame comprised of a single elongated frame member having said alternating directional portions;
    a plurality of shelf elements on said frame positioned on said alternating directional portions for providing for a support surface, forming two columns of shelf elements on said frame, one on each side of said frame; and
    a plurality of vertical support members secured to said columns of said shelf elements providing rigidity of said shelf elements on said frame.

12. The device according to claim 11 wherein said frame is a zigzag frame having approximately a 90° angle between each zig portion and each zag portion of said frame.

13. A storage device comprising:

a frame having a plurality of alternating directional portions;

a plurality of shelf elements on said frame positioned on said alternating directional portions for providing a support surface, said shelf elements forming two columns of shelf elements on said frame, one on each side of said frame; said shelf means having an overall planar triangular configuration comprising:

a crossbar;

a pair of securing portions adjacent to said crossbar for securing said shelf element to said support members;

a pair of legs adjacent to said securing portion for supplying a support member to said storage device; and a pair of arms adjacent to said legs being substantially perpendicular to one another for securing said shelf element to said frame; and a plurality of vertical support members secured to said columns of said shelf elements providing rigidity of said shelf elements on said frame.

14. A device according to claim 13 wherein said plurality of support members are four elongated rods said rods having a plurality of angular portions secured to said plurality of shelf elements at said securing portions, and extending beyond said shelf elements for providing support legs for a free standing storage device.

15. A storage device according to claim 14 wherein a hook portion is adjacent to two of said support members for hanging of said storage device.

16. A storage device according to claim 15 wherein said shelf elements are of different sizes increasing in size from said support legs to said hanging element of said frame.

17. A storage device according to claim 16 wherein a measuring means is mounted to one of said support members.

18. A storage device according to claim 17 wherein an identification means is mounted on said device for identifying individual shelf elements.

19. A storage device according to claim 18 wherein said identification means and said measuring means are color coded to correspond to one another.

* * * * *